AUTOMATIC MEAT CUTTING MACHINE
Original Filed May 28, 1970 2 Sheets-Sheet 1
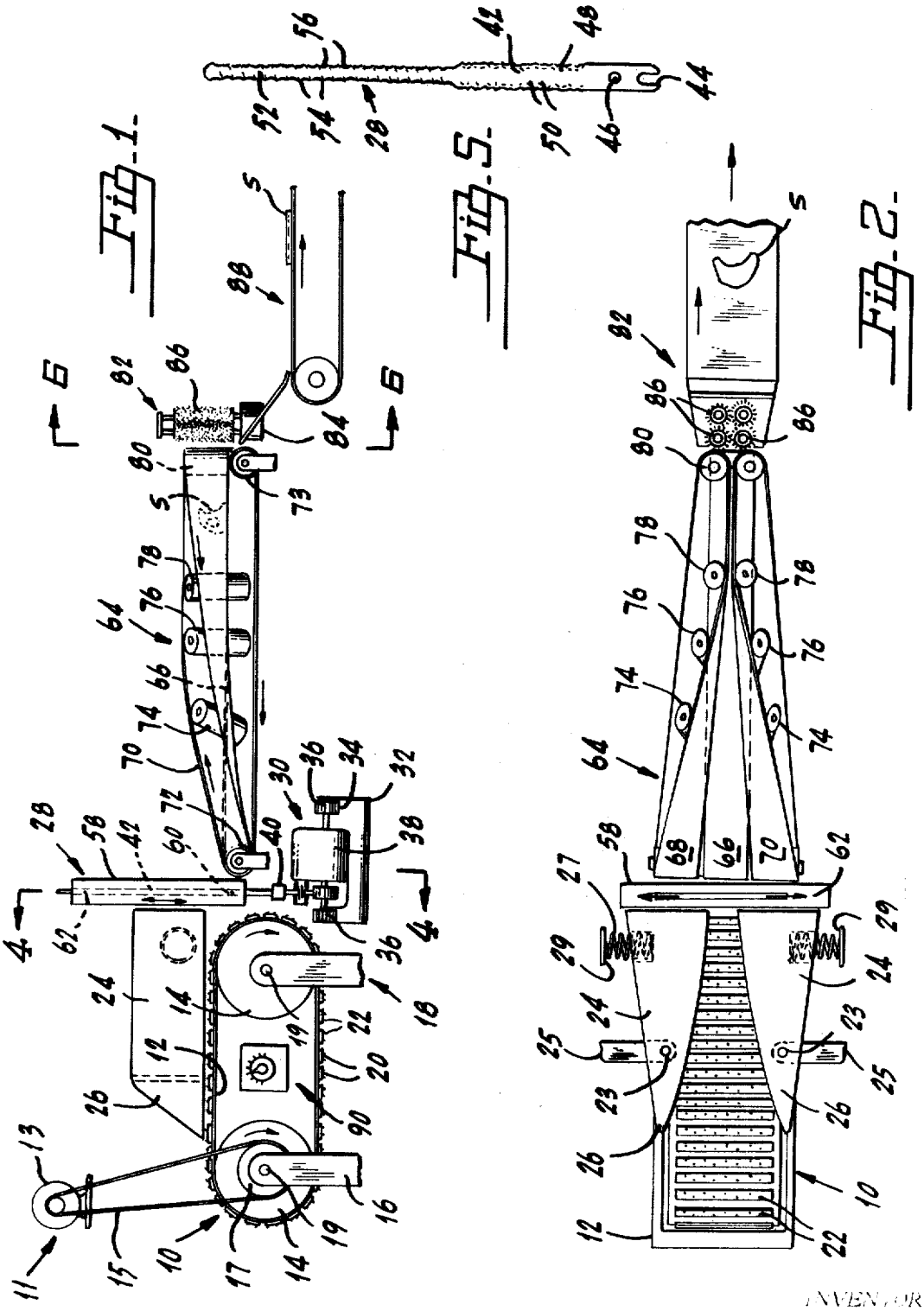
INVENTORS
MORRIS MELTZER &
DONALD D. MEYER
BY Sperry and Zoda
ATTORNEYS

AUTOMATIC MEAT CUTTING MACHINE

Original Filed May 28, 1970 2 Sheets-Sheet 2

INVENTORS,
MORRIS MELTZER &
DONALD D. MEYER
BY Sperry and Zoda
ATTORNEYS

United States Patent Office

Re. 28,077
Reissued July 16, 1974

28,077

AUTOMATIC MEAT CUTTING MACHINE

Morris Meltzer, 1350 Woodbourne, G-118, Levittown, Pa. 19057, and Donald D. Meyer, 2261 S. Hardwood Ave., Upper Darby, Pa. 19082

Original No. 3,631,908, dated Jan. 4, 1972, Ser. No. 41,472, May 28, 1970. Application for reissue Jan. 15, 1973, Ser. No. 323,819

Int. Cl. B26d *4/22*

U.S. Cl. 83—101 16 Claims

Matter enclosed in heavy brackets [ ] appears in the original patent but forms no part of this reissue specification; matter printed in italics indicates the additions made by reissue.

*ABSTRACT OF THE DISCLOSURE*

*An automatically operating machine receives pork loins, loins of beef, or other meat products, either boned or boneless, and cuts them into steaks, chops, or the like. Adjustments are provided in the machine such that the thickness of the slices is selectively regulated by varying the speed with which the product is fed to and through the cutting mechanism. The cut slices are conveyed to a cleaning brush assembly, being brought to a vertical position to be fed therethrough, and are thereafter discharged for packaging and final processing.*

BACKGROUND OF THE INVENTION

1. Field of the Invention

The invention pertains to the meat-cutting art, in general, and viewed more specifically pertains to the provision of apparatus for automatically cutting steaks, chops, or the like from large boned or boneless meat products such as pork loins, loins of beef, etc.

In the broadest sense, the invention pertains to the art of meat cutting. Considering, however, that the invention necessarily embraces conveying mechanisms, cutting mechanisms, and cleaning means, all incorporated in a fully integrated apparatus for the purpose of receiving large uncut meat products and converting the same automatically into cleaned slices, the invention pertains to fields of art that may relate also to sawing, cleaning, saw blade construction, and conveying.

2. Description of the Prior Art

There has been considerable development, over the years, in the art of cutting foods, and many patents have been issued on apparatus for cutting bread, beacon, pastry, etc. It is also known to provide meat-cutting machines, which might be employed in slicing off steaks or chops from loins, and the like. However, these have involved an excessive amount of manual control, and have not been designed to perform automatically the complete operation of slicing off the steaks or chops, cleaning them, and discharging them for final processing.

Typical of the prior art are the following patents:

| Number | Name | Date |
|---|---|---|
| 210,421 | G. W. Griffin | Dec. 3, 1878 |
| 884,744 | C. L. Libby & P. J. Connor | Apr. 14, 1908 |
| 998,713 | F. A. Miller | July 25, 1911 |
| 1,201,168 | F. M. Glenn | Oct. 10, 1916 |
| 1,317,690 | A. E. Fewell | Oct. 7, 1919 |
| 1,683,445 | E. C. Brock | Sept. 4, 1928 |
| 1,879,211 | J. L. Hail | Sept. 10, 1932 |
| 1,917,889 | H. E. Jacques | July 11, 1933 |
| 1,942,991 | C. T. Walter | Jan. 9, 1934 |
| 1,951,880 | J. Niederhofer | Mar. 20, 1934 |
| 2,076,959 | H. H. McKee et al. | Apr. 13, 1937 |
| 2,345,261 | O. M. Jensen | Mar. 28, 1944 |
| 2,514,660 | E. R. McClure | July 11, 1950 |
| 2,570,700 | P. Marcerou | Oct. 9, 1951 |
| 2,671,267 | H. F. Michalek | Mar. 9, 1954 |
| 2,690,774 | B. V. Hoard | Oct. 5, 1964 |

TABLE—Continued

| Number | Name | Date |
|---|---|---|
| 2,802,431 | W. F. Hoagland, et al. | Aug. 13, 1957 |
| 2,969,878 | J. H. V. Finney, Jr. | Jan. 31, 1961 |
| 2,998,121 | N. W. Gilbert | Aug. 29, 1961 |
| 3,311,221 | H. H. Burkitt, et al. | Mar. 28, 1967 |
| 3,304,607 | J. M. Gratsch | Feb. 21, 1967 |

In the prior art, there has been no suggestion for a complete apparatus on which, at one end, there can be deposited, either in a single or in plural paths, entire pork loins, loins of beef, etc., and which will, at comparatively high speed, cut the products so received into chops, or steaks or meat slices of any selected thickness, will clean the cut portions, and will dischrage them at a selected, constant speed to a wrapping station or other station at which further processing is effected. The desirability of such a machine will of course be quickly appreciated, considering the fact that in the present economic situation the reduction of labor costs is of very great importance, especially in view of the extremely competitive nature of the food merchandising business.

SUMMARY OF THE INVENTION

In light of the problems presently existing in the art, which problems as noted above have not to our knowledge yet been solved by the patents previously issued, we have devised a complete automatic meat-cutting machine which will efficiently discharge the functions indicated above as desirable. To this end, our machine includes a feed conveyor, specially designed to grip the uncut meat product, such as a pork loin, and feed it to a cutting mechanism without possibility of the meat product deviating from its proper position either rearwardly or laterally while being cut. The cutting mechanism, an important part of the invention, comprises a vertically reciprocating double-edged-blade of a particular, novel design, reciprocating at high speed within a guide frame. A drive motor for the blade is mounted for self-propulsion in a transverse direction, whereby to move back and forth in a horizontal path across the product being cut, thus to bodily carry the vertically reciprocating blade across the product, with the slices being cut from the product during travel of the blade assembly and motor in either direction transversely of the path in which the product is being conveyed.

The invention incorporates means for bodily adjusting the blade assembly and its associated motor vertically, so as to locate selected portions of the blade in cutting position in respect to certain areas of the meat. Thus, by making this adjustment, the blade portion adapted for sawing through bone may be properly positioned for cutting through bone. Or, the apparatus can be adjusted for properly locating the blade to cut through boneless meat products, as desired.

The invention further incorporates means for adjusting the thickness of the chops or meat slices, by regulating the speed with which the products are carried to and through the cutting mechanism. And, further summarized, the invention incorporates means receiving the slices, tilting them gradually to a vertical position, and brushing them clean of saw dust, for discharging them to an off-bearing conveyor, which carries them to other stations at which wrapping or other final processing operations are effected.

BRIEF DESCRIPTION OF THE DRAWING

FIG. 1 is a side elevational view, portions being broken away, of an automatic meat-cutting machine according to the present invention;

FIG. 2 is a top plan view;

FIG. 5 is an enlarged perspective view of the saw blade per se;

DESCRIPTION OF THE PREFERRED EMBODIMENT

Figure 3:
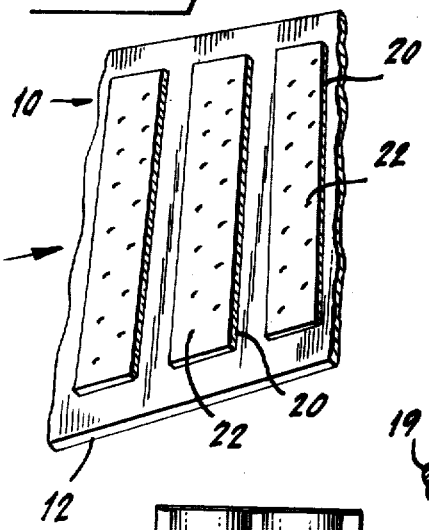
FIG. 3 is an enlarged, fragmentary perspective view of the feed conveyor on which the uncut product is supported for transportation to the cutting mechanism.

The apparatus comprising the present invention incorporates at the intake or head end thereof, a feed conveyor structure generally designated 10. This includes a conveyor web 12, of the endless type, trained about conveyor pulleys 14, 14 one of which would be driven by a suitable drive mechanism generally designated 11 and illustrated somewhat diagrammatically as including a conveyor drive motor 13, conveyor drive belt 15, and conveyor drive pulley 17.

The conveyor structure 10 can be suitably supported upon a support frame generally designated 18, said frame being a rigid framework for the entire apparatus and including support arms 16 for the shafts of the pulleys or rollers 14.

The conveyor web 12 can be of any desired length as regards the distance between the shafts 19 on which rollers 14 are mounted. It is mainly important that the conveyor structure 10 be of a length such that the longest, largest uncut meat product to be handled, may be deposited thereon and effectively ripped and conveyed in proper position by the conveyor structure to a cutting mechanism. In the illustrated example, thus, and referring now to FIG. 3, conveyor structure 10 is so designed that on the flexible web 12 thereof there are secured like, closely spaced transversely extending, flat, rectangular cleats or slats 20 which might be of stainless steel or other suitable material. Rigid with each cleat 20 is a series of gripping prongs 22, and as will be noted from FIG. 3, the prongs of each series are staggered longitudinally of the path in which the top flight of the conveyor moves as indicated by the direction arrow in FIG. 3.

Further, the prongs are uniformly spaced transversely of the conveyor web, also as shown in FIG. 3.

The particular form of each prong is significant, and as will be noted from FIG. 3, the prongs are progressively reduced in diameter in a direction toward their distal ends, and are inclined forwardly in the sense of direction of the top flight of the conveyor. Further, the prongs are curved forwardly in the sense of said direction of conveyor movement. As a result, the uncut meat product, though it be large and heavy, is immediately gripped by the prongs, which penetrate said product, responsive only to the act of depositing the uncut product upon the top flight of the conveyor. When the product is so gripped, it will be held effectively by the prongs against retrograde or lateral deviation. This is of importance because the uncut product must be fed through a cutting mechanism, and while being so fed should not be permitted to slip backwardly.

In this way, the pork loin or other uncut meat product is continuously advanced, so that each time a chop or slice is cut therefrom, it will be advanced sufficiently to cause the next chop, of the same thickness, to be cut therefrom on the return movement of the saw blade assembly.

It is also desirable, as shown in FIGS. 1 and 2, to provide a pair of transversely spaced guides 24, disposed in overlying relation to the top flight of the conveyor, at the end of the conveyor where the conveyed product is to be sliced. These guides are preferably spring loaded in the sense that they may yield transversely, particularly at the discharge end of the conveyor structure 10. We have illustrated this arrangement somewhat diagrammatically, in that each guide 24 is shown as being pivoted at 23 upon a pivot pin located adjacent the narrower end of the guide, which as shown in FIG. 2 is progressively increased in width in a direction toward the discharge end of the conveyor. Pins 23 may be suitably supported upon laterally inwardly projecting, stationary arms 25 of the support frame. At the other ends of the guides 24, springs 27 may be provided, of the compression type. These seat at one end in laterally outwardly opening recesses of the conveyor guides, and at their other ends bear against stationary abutments 29 provided upon the support frame 18.

By reason of this arrangement, it will be observed that the guides cooperate with the prongs 22 in holding the meat products against lateral deviation. The springs are sufficiently strong to prevent the uncut loin from laterally deviating, when engaged by the vertically reciprocating, transversely moving saw blade. Yet, the guides yield sufficient to accommodate loins of different thicknesses, so that any of various uncut products differing from one another in size or shape, may be accommodated by the machine without the necessity of making special adjustments therein.

Figure 4:
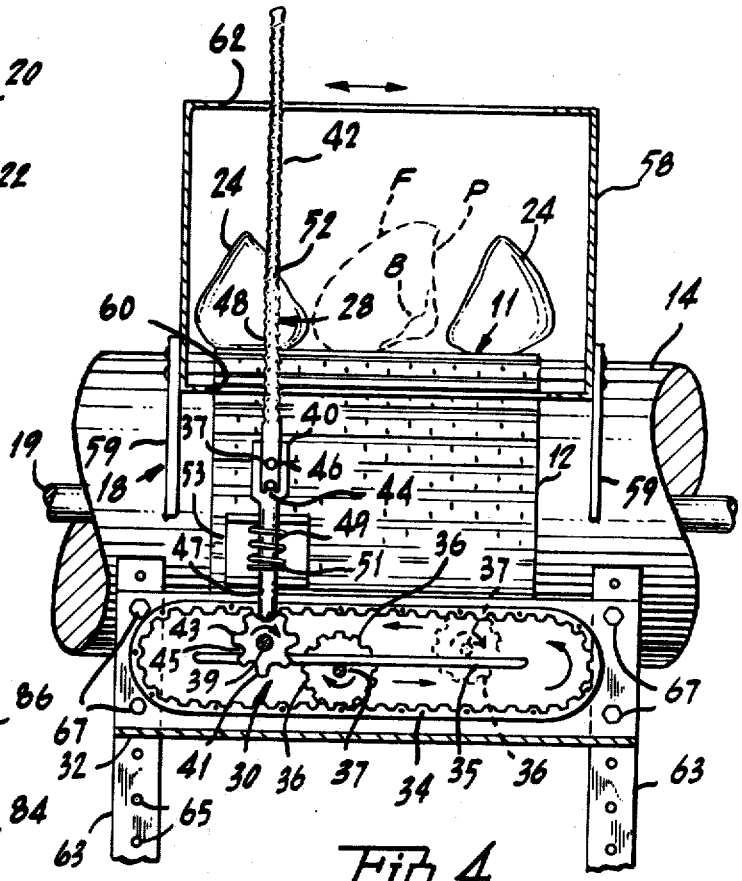
FIG. 4 is an enlarged transverse sectional view through the cutting mechanism, substantially on line 4—4 of FIG. 1.

The machine further includes a blade means generally designated 28, and this has been illustrated to particular advantage in FIG. 4.

The blade means (See FIG. 1) includes a blade-drive assembly 30. Assembly 30 is designed to vertically reciprocate a blade element at a high rate of speed, while at the same time bodily moving the blade element in a direction transversely of the apparatus, as shown by the direction arrows in FIG. 4.

To this end, assembly 30 is supported in a stationary, transversely extending support channel 32 of U-shaped in cross section, on the sidewalls of which are mounted inwardly facing trackways 34. As shown in FIG. 4, each trackway 34 is an elongated, ovally shaped rack having a continuous series of inwardly directed teeth. Extending longitudinally and centrally of the continuous rack 34 is a guide bar 35, the ends of which terminate short of the rounded ends of rack 34.

Supported by and in mesh with the racks or trackways 34 are pinions 36, mounted upon the ends of a pinion drive shaft 37 which in effect serves as an axle supporting a drive motor 38 for back and forth movement along the length of the racks 34. Motor 38 would be provided with a suitable gear-reduction means whereby relatively slow-speed rotational movement is imparted to the shaft 37.

The pinions 36 in effect comprise support wheels, rollably supported upon the racks 34. As a result, when motor 38 is in operation, pinions 36 turn, and by reason of being in mesh with racks 34 cause the motor to move traversely of the apparatus. When the pinions reach an end of the racks 34, they remain in mesh with said racks, and as a result tend to travel around the ovally shaped ends of the racks. Shaft 37 is in rollable contact, at all times, with bar 35, and as a result, shaft 37 travels around the end of the bar.

As will be noted from FIG. 4, by way of illustration we have shown the pinion 36 in a full line position, turning clockwise about the axis defined by shaft 37. This causes the pinion, when in engagement with the bottom side of rack 34, to travel to the right in FIG. 4. As the pinion moves around the righthand end of the bar 35, still turning clockwise, it will be caused to now travel to the left in FIG. 4, the shaft 37 now being rollably supported upon the top surface of bar 35 as shown in the dotted line illustration in FIG. 4. When the pinion reaches the left-hand end of bar 35, viewing the same as in FIG. 4, it will travel around the bar and will once again move to the right, below bar 35.

By reason of this arrangement, when motor 38 is placed in operation it will travel back and forth between the opposite ends of the racks 34, so as to impart a transverse reciprocating motion to the blade assembly 28.

The motor 38 has a motion-translating driving connection 40 to the blade assembly 28. In the illustrated example, and referring primarily to FIG. 4, a drive cam 41 is keyed or otherwise secured to shaft 39 of the motor for rotation therewith. Drive cam 41 has a series of alternating peaks and valleys 43, 45 respectively. At this point, it may be noted that shaft 39 and shaft 37 would normally both be output shafts of the gear train driven by motor 38. Said gear train is not shown, since it would be basically conventional, and would be so designed as to cause shaft 39 to rotate at a selected high rate of speed, while shaft 37 would rotate at a selected low rate of speed. It is sufficient to note that the drive cam 41, when rotated at relatively high speed imparts a vertical reciprocating motion to the blade means 28. To this end, there is provided an elongated, vertically extending blade element 42, provided at its proximal end with an end slot 44 and opening 46 adapted to receive small lugs 37 provided upon the flattened upper end of a support rod 47.

Blade element 42 has a proximal part extending for perhaps one third of its length, designated 48 and formed with small teeth 50. This proximal part is double-edged, and the teeth might in a preferred example be of tungsten carbide or the like, designed to saw easily through very hard substances such as bone.

The distal part 52 of the blade is also of double-edged form, but has widely spaced low teeth 54 each of which is offset slightly out of the general plane of the blade element, said teeth alternating with elongated, shallowly curved indentations or recesses 56. This imparts a scalloped edge formation to the distal part 52 of the saw blade element. This part is particularly adapted for sawing through meat or fiber as distinguished from the bony parts of the meat product.

The entire blade could be of one piece form, and preferably would be made out of a material such as titanium steel.

Bar 47, as noted in FIG. 4, is vertically reciprocable in guide openings formed in the horizontal upper and lower portions of a C-shaped support bracket 53 fixedly secured to the housing of motor 38. Abutting against the top portion of bracket 53 is the upper end of a compression spring 49, the lower end of which abuts against a collar 51 affixed to bar 47. By reason of this arrangement, each time bar 47 is urged upwardly in respect to the bracket 53, spring 49 tends to urge the bar 47 downwardly. The spring thus, keeps the rounded lower end of bar 47 in firm but slidable contact with the smoothly surfaced, scalloped edge of cam 41. Therefore, as the cam rotates in the direction shown by the arrow in FIG. 4, bar 47 will ride upwardly and downwardly on the peaks and valleys 43, 45, whereby to impart a high-speed reciprocation of blade element 42 in a vertical direction. Meanwhile, as previously noted, the entire blade assembly and motor are being bodily moved back and forth in a horizontal direction, to slice off steaks or chops on each pass of the blade across the meat product, whether the blade is moving to left or to right viewing the same as in FIG. 4.

To guide the blade in its vertical reciprocating motion and also in its movement in a vertical, transverse plane back and forth across the end of the conveyor structure 10, we provide an upright, rectangular guide frame 58, which may be mounted on suitable stationary support arms 59 of the support frame 18 of the equipment. Frame 58 has bottom and top guide slots 60, 62 respectively in which the blade element is slidably guided both in its up and down movement and in its movement in a transverse direction.

Still referring to FIG. 4, the entire blade assembly 28, blade drive assembly 38, and support channel 32 may be bodily adjusted upwardly and downwardly. The purpose of this is to locate the proximal and distal portions 48, 52 of the blade element in respect to the meat product, according to whether or not the uncut product has bones in it, and according to where said bones are located. If for example the product is a pork loin, having bones on its underside and also extending part way upwardly within the loin, the support channel 32 would be adjusted upwardly so as to dispose the distal part 48 of the blade element in position to saw through the bones. Said distal part 48 would of course also saw through fiber or fat wthout difficulty. If, however, a boneless meat product is being cut, it may be desirable to adjust the support channel 32 in a downward direction, so as to now locate only the distal part 52 of the blade element in position to saw through the meat product.

This is achieved in the illustrated example through the provision of support arms 63 to which the channels 32 is secured. Arms 63 are part of the support frame, and include a plurality of uniformly spaced openings 65 arranged in a vertical series. These openings register with openings provided in the sidewalls of the channel 32, and retaining bolts 67 extend through the registered openings to mount the support channel upon the arms 63 in selected positions of vertical adjustment.

It may be noted that each time the motor reverses its direction of travel transversely of the equipment, it will move slightly upwardly or downwardly, according to whether the shaft 37 is supported against the underside or against the upper side of the bar 35. However, this vertical displacement of the motor during normal use is very minor, and does not affect the main adjustment of the height of the motor produced through the provision of the openings 65 and bolts 67.

It will be understood that with the motor traveling back and forth, and an uncut meat product fed through the guide frame, said meat product will be sliced in steaks, chops, or the like of a selected thickness, as the blade element, reciprocating vertically at high speed, travels back and forth at relatively slow speed across the meat product.

As the meat slices are completely severed from the meat product, they drop off on to an intermediate or second conveyor 64.

This, as shown in FIG. 2, actually comprises three side-by-side, relatively narrow conveyor webs 66, 68, 70. The center web 66 remains in a horizontal position as shown in FIG. 1, while the side webs 68, 70 are initially horizontal, but are converted along the upper flights thereof to be disposed in vertical planes at the discharge end of the intermediate conveyor.

The several conveyor webs can be driven by a common drive roller 72 located at the head end of the intermediate conveyor. At the discharge end of the intermediate conveyor, an idler roller 73 is provided for the intermediate web 66. With respect to the side webs 68, 70, there are provided longitudinally spaced idlers 74, 76, 78, 80 in a direction toward the discharge end of the intermediate conveyor, the idlers of the side rollers are inclined from the horizontal at a progressively greater angle in respect to the horizontal, so that ultimately, rollers 80 are in completely vertical positions. A motor 81 drives roller 72.

Figure 6:
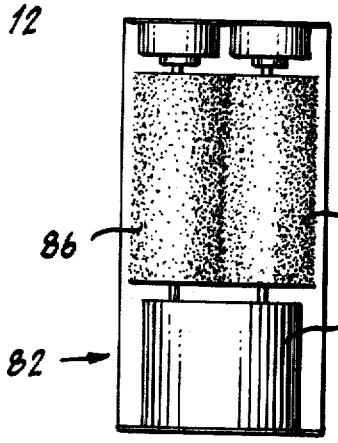
FIG. 6 is an enlarged transverse sectional view substantially on line 6—6 of FIG. 1, showing the cleaning brush assembly.

As a result, as a slice of meat drops onto the intermediate conveyor, it is initially horizontal. However, as it travels to the right in FIG. 2, it is acted upon by the side webs, so as to be tilted gradually to a completely vertical position in which it passes between the rollers 80 into a brush assembly generally designated 82. Brush assembly 82 is disposed immediately beyond the discharge end of the intermediate conveyor 64, and as shown in FIG. 6 may include a motor 84 having a suitable gear reduction means to drive rotary brushes 86 in opposite directions. The brushes thus turn into each other so as to clean not only the meat surface, but also to produce a self-cleaning action as regards the brushes. Preferably, the brushes are mounted in floating bearings so as to not dig into the meat surface, whereby the brushes will yield as necessary according to the thickness of the meat passed therebetween. This cleans bone dust, and particles of fat or fiber from the meat slices, after which the meat slices pass onto a discharge conveyor 88 for movement to a takeoff station.

The slices S may be processed further in any way desired, as for example wrapped, priced, weighed, etc.

We also provide in our apparatus means to adjust the thickness of the slices S. To this end, a speed control generally designated 90 is illustrated (see FIG. 1), which is a conventional device designed to adjust the speed of operation of the conveyor drive motor 13. By adjusting the speed of travel of the meat product into the saw blade assembly, we thereby adjust the thickness of each slice. The slower the movement of the meat through the saw blade guide frame 58, the thinner will be the slices cut therefrom.

It is also believed sufficiently obvious as not to require special illustration, that in a large operation involving the processing of large quantities of meat products, as for example a central meat-cutting operation for a large, city-wide chain of food stores, we may provide in a single apparatus a plurality of side-by-side feed conveyors 10, all mounted upon the same support frame, and all feeding into a single transversely reciprocating blade assembly 28. In this event, the blade assembly 28 would have a horizontal pass across the width of the machine that might be much wider than illustrated by way of example. In such an arrangement, the blade assembly shown, when moving to the right in FIG. 4, would cut off, as it goes, chops from each of a plurality of side-by-side loins, each traveling through the guide frame upon its own separate conveyor web 12. A corresponding increase in the number of intermediate conveyors and brush assemblies would of course be provided in such an event. And, it will be noted that it is not essential in such an arrangement that all of the side-by-side conveyors operate at the same speed. One feed conveyor might be operating at a speed such as to cause pork chops of a particular thickness to be cut from pork loins carried thereby. At the same time, an adjacent conveyor might be moving at a faster rate of speed, so as to cause double-thickness pork chops to be cut therefrom by the same blade. It is even possible to have different types of meat fed simultaneously through the same blade assembly.

With further reference to the feed conveyor operation, it is important that this conveyor be moving to advance the meat product into slicing position, at such times, and only at such times, as the blade means 28 is not actually slicing. In other words, as the blade means approaches the meat product, and begins cutting of the next slice or chop, the meat product must be stationary. If the conveyor were to continue advancement of the product during the time that the blade means was cutting therethrough, wedge shaped slices or chops would be cut, rather than slices or chops of a predetermined uniform thickness.

Thus, it will be understood that immediately upon completion of a pass of the blade means through the meat product in either direction, the feed conveyor web 12 should begin to move to advance the leading end of the uncut loin or other meat product sufficiently to position it for cutting of the next following slice or chop. This advancement should occur while the blade means is reversing direction and is moving back into position to make the next pass through the meat product. Then, once again, as the blade means begins to slice through the meat product, this time in the reverse direction, the conveyor web should halt its forward movement, whereby to position the meat product for cutting of said next following slice.

Figure 7:
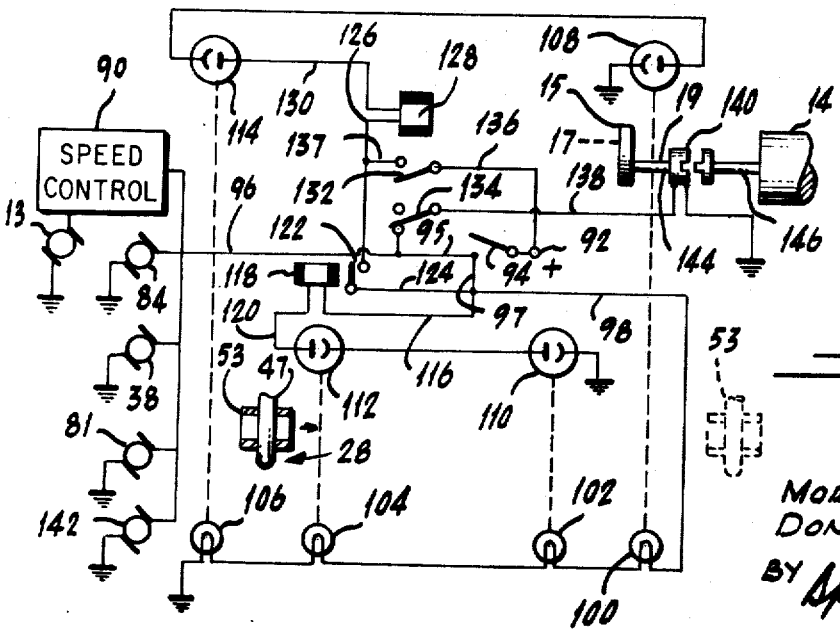
FIG. 7 is a schematic illustration of the feed conveyor control circuit.

To this end, we have provided control circuitry as shown in FIG. 7, specifically designed to accomplish the desired step by step advancement of the meat product, advancing it between cuts and holding it stationary during the actual cutting or slicing operation.

Referring to FIG. 7, a source of positive potential has been designated 92, and a master control switch 94, adapted to be manually operated, controls the flow of current from the source 92 to all electrical components of the equipment. Thus, when the operator closes switch 94, current flows from source 92 through leads 95, 96 to the feed conveyor drive motor 11, the brush assembly drive motor 84, the blade assembly drive motor 38, and a motor 81 which as understood would have a driving connection with drive pulley 72 of intermediate conveyor 64. Thus, by closing switch 94, all of the drive motors go into operation, with the blade means thus being set into operation to move continuously in a horizontal path back and forth, while vertically reciprocating the blade at high speed. The brushes are also placed into constant operation, as is the motor 14 of the feed conveyor structure 10. As to the motor 13, the speed thereof would be controlled by the speed control device 90 previously described herein, for the purpose of adjusting the thickness of the slices to be cut.

Current returns to the source from the several motors 13, 84, 38, 81 through ground as shown in FIG. 7.

Closure of switch 94 also causes current to flow from the source 92 through leads 97, 98 to a plurality of light beam emitting lamps 100, 102, 104, 106, with the current returning through ground.

The beams of said lamps are directed as shown by the dotted line paths in FIG. 7, to phototubes 108, 110, 112, and 114 respectively.

Closure of switch 94 also causes current to flow from the source thereof through leads 97, 116, the winding of a starting relay 118, lead 120, phototubes 112, 110, and back through ground.

The normally energized winding of relay 118 holds contacts 122 of said relay in a normally opened position as shown in FIG. 7. Whenever said winding is deenergized, accordingly, relay contacts 122 will close, so that with switch 94 closed, current flows from the source 92 through leads 97 and 124, relay contacts 122, lead 126, the winding of a holding relay 128, lead 130, phototubes 114 and 108, and back through ground.

Relay 128 is normally deenergized, and has a set of normally open contacts 132 linked for joint operation with a set of normally closed contacts 134. Whenever the winding of relay 128 is energized, contacts 132 will close and current will flow from source 92 through lead 136, closed contacts 132, lead 137 and lead 126, the winding of relay 128, lead 130, phototubes 114, 108, and return through ground.

Also, when the winding of relay 128 is energized, contacts 134 will open, interrupting a flow of current normally coming from source 92, closed switch 94, lead 95 normally closed contacts 134, lead 138 an electromagnetic clutch 140, and return through ground.

Considering the control of the feed conveyor in reference to the blade assembly in greater detail, let it be assumed that switch 94 is closed, to begin operation of the equipment. In these circumstances, current will flow to the feed conveyor drive motor 13, which will operate at a previously selected rate of speed according to the predetermined, adjusted setting of the speed control 90. Motor 84 of the brush assembly will be placed in continuous operation. Motor 38 also operates continuously, at a constant rate of speed, to vertically reciprocate the blade element and to cause the blade means to be shifted horizontally back and forth across the meat product P for the purpose of slicing through the bone B and fiber F thereof for cutting off chops or slices. Motor 18 also goes into continuous, constant speed operation for driving the intermediate conveyor 64. Further, a motor 142 can be energized at the same time, for driving the discharge conveyor 88.

The driving of the feed conveyor, as shown in FIG. 7, is controlled by clutch 140. The cooperating elements of the clutch are connected to coaxial portions 144, 146 of the shafts 19 rotated by drive pulley 17.

Thus, as soon as switch 94 is closed, a circuit will be closed through the clutch 140, so that with motor 13 operating at a predetermined, adjusted speed, the conveyor web 14 will travel at the desired speed to advance the meat product P.

In FIG. 7, the blade means 28, and specifically supporting bracket 53 thereof, is illustrated in full lines after it has moved partially away from its left-hand extreme position, viewing the same as in FIG. 4. In other words, the bracket 53 is shown in full lines in FIG. 7 in the same position in which it is in FIG. 4. At this time, it is about to begin slicing the product P in a left-to-rght direction.

Immediately before the blade element 42 enters the meat product, bracket 53 interrupts the light beam extending between lamp 104 and phototube 112. As a result, the winding of relay 118 is deenergized momentarily while said light beam remains interrupted, permitting contacts 122 to close momentarily.

The closure of contacts 122 closes a circuit momentarily through the winding of relay 128. As a result, contacts 132 close. Therefore, relay 128 locks, remaining energized despite the reenergization of relay 118 and the resultant opening of contacts 122 after bracket 53 passes through the beam between lamp 104 and phototube 112. With holding relay 128 thus locked, contacts 134 are held open, as a result of which the feed conveyor structure 10 is declutched.

Thus, just as the blade enters the meat to make a pass therethrough from left to right, the conveyor web 12 is stopped, so that the meat product P remains stationary as the chop or slice is cut therefrom.

As soon as the slice S is completely cut off, bracket 53 interrupts the beam between lamp 102 and phototube 110. Although this momentarily deenergizes relay 118 once again, there is no effect on relay 128 at this time, since this relay remains energized to hold the feed conveyor structure in a declutched or disengaged condition.

Bracket 35, continuing to move to the right, now interrupts the beam between lamp 100 and phototube 108. This interrupts the flow of current through the winding of relay 128, as a result of which the relay winding is deenergized, causing contacts 132 to revert to open position and causing contacts 134 to revert to closed position. As a result, clutch 140 engages instantly, and the conveyor web now begins to move to advance the product P at the predetermined, selected rate of speed.

Ultimately, the bracket 53 moves to the dotted line position shown at the right in FIG. 7, and now reverses direction, while the meat product is being advanced to the selected extent. Passing now from right to left across the beam between lamp 100 and phototube 108, it has no effect at this time on this phototube. However, it then interrupts the beam between lamp 102 and phototube 110 just prior to entry of the blade into the advanced meat product. Let it be assumed that the meat product is being advanced at a selected, slow rate of speed designed to cause a 1-inch projection of the meat product past the plane of the blade element. As soon as the beam between lamp 102 and phototube 110 is interrupted, once again the relay 118 is deenergized, contacts 122 close, relay 128 is energized, and clutch 140 is disengaged to stop the conveyor prior to entry of the blade into the meat. The blade thus slices through the bone B and fiber F now passing from right to left, to cut another slice or chop while the conveyor is stationary.

At the completion of the right to left pass, the bracket 53 will ultimately interrupt the beam between lamp 106 and phototube 114, again deenergizing relay 128 and consequently engaging clutch 140.

It is thus seen that one can select the rate of speed of advancement of the product, so that whenever the conveyor is stopped, there will be a predetermined projection of said product past the plane of the cut, permitting slices or chops to be cut at any desired thickness.

It is understood that the machine hereinbefore described can be loaded either automatically or manually. The present invention is primarily concerned with the construction and the operation of the machine for cutting the meat products, and it does not concern itself with systems, apparatus, or methods, that may be employed for the purpose of loading the machine. Accordingly, it is believed obvious, sufficiently so as not to require special illustration and description herein, that the apparatus can be one of a row or series of similar cutting machines or devices, all automatically loaded by means of a conveyor or other system adapted to feed the machine from a single remote location.

Accordingly, it is further believed sufficiently obvious as not to require special illustration that in such an event, if the flow of products should stop for any reason, systems, switches, or other circuitry could be embodied in the apparatus responding to the absence of a product on the feed conveyor, in such fashion as to automatically shut down the machine, either placing it in a standby condition with the conveyors declutched, awaiting a fresh supply, or alternatively, shutting the equipment down completely, awaiting its next use.

It will be apparent that automatically, the machine will act upon and cut into slices pork loins, loins of beef, and any of various other meat products which may or may not have bones therein. The only labor involved is to observe the operation of the machine and feed uncut meat products thereto.

We claim:

1. Apparatus for automatically cutting steaks, chops, and the like, comprising:
   a. a support frame;
   b. a feed conveyor for advancing an uncut meat product to a cutting station;
   c. a cutting station including
      1. blade means mounted for reciprocating movement in a plane across said product to slice off portions thereof, and including a blade element reciprocating in said plane in a path normal to the path of reciprocating motion of the blade means;
      [2. means to reciprocate the blade means at a speed and frequency having an adjustable ratio of the speed of the feed conveyor, thus to provide sliced portions of a selected thickness;]
      *2. means for advancing the feed conveyor, between cutting strokes of the blade means, in a step-by-step motion in which each step corresponds to the thickness of the portion to be sliced off and is adjustable for a selected thickness of said sliced portions;*
   d. conveyor means receiving the sliced portions and advancing the same to a cleaning station; and
   e. brush means at the cleaning station through which said portions are fed, said brush means arranged to clean saw dust from opposite sides of each portion fed therethrough.

2. Apparatus as in Claim 1 wherein said feed conveyor includes a series of prongs inclined forwardly upwardly in the direction of travel of the meat-product-supporting flight of the conveyor.

3. Apparatus as in Claim 2 wherein the feed conveyor further includes transversely extending support plates to which said prongs are secured.

4. Apparatus as in Claim 2 in which the prongs on each plate are staggered transversely of said direction of movement of the product-supporting flight of the conveyor.

5. Apparatus as in Claim 1 wherein the blade element is of double-edged formation for slicing off portions of said product on both the advance and return strokes of the reciprocating blade means.

6. Apparatus as in Claim 5 wherein each edge of the blade element is formed for part of its length with teeth adapted for boneless meat cutting and for the remaining part of its lentgh for bone sawing.

7. Apparatus as in Claim 6 in which the first named part of the blade edge is of scalloped form with relatively low teeth offset relatively to the plane of the blade element and alternating with concavely curved notches.

8. Apparatus as in Claim 6 wherein the edges of said remaining part of the blade length are generally straight and are formed with small hardened teeth for cutting through bone formations occurring in said product.

9. Apparatus as in Claim 8 wherein the blade element and said means for reciprocating the blade means are mounted for bodily adjustment in the direction of the blade element for selective positioning of said parts of the blade element in respect to the product according to whether bone sawing or boneless meat cutting operations are to be performed.

10. Apparatus as in Claim 1 wherein the blade element is mounted in an upright guide frame for guiding the same during reciprocation of the blade element, said means for reciprocating the blade means comprising a motor having pinions mounted at opposite sides thereof and driven by the motor, and stationary racks extending in parallelism with said plane, said pinions being in mesh with the respective racks and the racks being formed to translate the rotation of the pinions into said reciprocating movement thereof and hence of the motor in a path parallel with said plane.

11. Apparatus as in Claim 1 wherein said conveyor means is arranged to move the sliced portions from a horizontal position to a vertical position in which to feed the same through the brush means.

12. Apparatus as in Claim 11 wherein the conveyor means includes an upper, slice-supporting flight formed with a plurality of side-by-side, flexible webs one of which is a horizontal center web and supports the slices horizontally, the other webs being side webs, said side webs being initially horizontal but being guided to vertical positions for tilting the slices to a correspondingly vertical position.

13. Apparatus as in Claim 12 wherein the brush means comprises at least one pair of oppositely rotating rotary brushes mounted to rotate about generally vertical axes at opposite sides of and beyond the space between the vertical positions of the side conveyor webs.

14. Apparatus as in Claim 12 including a series of guide rollers underlying each of said side webs, the guide rollers of each series being normally tilted at progressively increasing angles to the horizontal to effect the conversion of the side webs from the horizontal to the vertical.

15. Apparatus as in Claim 14 wherein said rollers are mounted for adjustment to horizontal positions whereby to selectively dispose the side webs in fully horozontal positions as an alternative to said progressive change of the side webs from the horizontal to the vertical.

*16. Apparatus for automatically cutting steaks, chops, and the like, comprising:*

*a. a support frame;*

*b. a feed conveyor for advancing an uncut meat product to a cutting station;*

*c. a cutting station including*

*1. blade means mounted for reciprocating movement in a plane across said product to slice off portions thereof, and including a blade element reciprocating in said plane in a path normal to the path of reciprocating motion of the blade means; and*

*2. means for advancing the feed conveyor, between cutting strokes of the blade means, in a step-by-step motion in which each step corresponds to the thickness of the portion to be sliced off and is adjustable for a selected thickness of said sliced portions, said blade means being limited to movement through a single cutting stroke across said meat product between each step of conveyor advancement and the next following step, said blade element being mounted for movement at high speed through a plurality of cycles of reciprocating movement during each of said cutting strokes of the blade means.*

References Cited

The following references, cited by the Examiner, are of record in the patented file of this patent or the original patent.

UNITED STATES PATENTS

| | | | |
|---|---|---|---|
| 3,202,028 | 8/1965 | Rabelow et al. | 83—241 |
| 3,537,351 | 11/1970 | Eck | 83—647 |
| 2,076,959 | 4/1937 | McKee et al. | 83—155 |
| 3,502,127 | 3/1970 | Nathanson et al. | 83—257 |

WILLIE G. ABERCROMBIE, Primary Examiner

U.S. Cl. X.R.

83—225, 416, 423, 647, 155, 778

UNITED STATES PATENT AND TRADEMARK OFFICE

CERTIFICATE OF CORRECTION

PATENT NO. : Re. 28,077
DATED : July 16, 1974
INVENTOR(S) : M. Meltzer et al.

It is certified that error appears in the above-identified patent and that said Letters Patent are hereby corrected as shown below:

In The Abstract:

Lines 8 and 9, the clause "being brought to a vertical position to be fed therethrough," should be deleted.

Signed and Sealed this

*twenty-fifth* Day of *May 1976*

[SEAL]

*Attest:*

RUTH C. MASON
*Attesting Officer*

C. MARSHALL DANN
*Commissioner of Patents and Trademarks*